Feb. 19, 1946. E. J. COLE 2,395,037

METHOD OF MAKING GRIP NUTS

Filed Aug. 10, 1944

Inventor
EDWARD J. COLE,

By Leech & Radue

Patented Feb. 19, 1946

2,395,037

UNITED STATES PATENT OFFICE 2,395,037

METHOD OF MAKING GRIP NUTS

Edward J. Cole, Peekskill, N. Y., assignor to Cole Machinery Mfg. Corp., a corporation of New York Application August 10, 1944, Serial No. 548,867

7 Claims. (Cl. 10—86)

This invention relates to grip nuts and to a method of making the same, and more particularly to the type of grip nut wherein a minor portion of the threaded bore in the crown of the nut is converged to reduce the diameter thereof and thus take up play between the threads when turned.

Essentially the invention comprises operating upon a standard threaded nut wherein the top surface thereof is indented in the form of a C around the threaded aperture, or the indentation may completely surround the bore in the form of an O. One of the salient features of the present invention is the formation of the C or O indentation surrounding the threaded bore in such a manner that there will be substantially no outward bulging or flaring of metal of the nut but only movement toward the center of the threaded bore. The actual formation of the indentation or annulus is of extreme importance.

In the prior art is Patent No. 1,967,276, to W. G. Wilson, patented July 24, 1934, in which the patentee discloses a method of converting a nut into a lock nut, comprising pressure indenting the top surface of a threaded nut to form an annular depression therein curved to conform substantially to the curvature of the adjacent wall of the aperture of the nut. The patentee alleges that the configuration and dimensions of the annular indentations are selected so that the portion of the threaded wall adjacent the indentation is effectively moved toward the center of the aperture without the lateral displacement of the metal of the nut outwardly so as to effect the wrench engaging surfaces. This prior inventor forms his indentation by means of an axially moving tool having a circular lower edge with diverging walls set at such an angle that the width of the indentation is greater than its depth. The patent states the diverging walls of the indenting tool are at about a 30°–45° angle, and the statement occurs in the specification that the wrench engaging surfaces throughout the axial length of the processed nut are substantially as they were in the original nut before conversion. In other words, Wilson states that there is no outer bulge or flare when using an indenting tool as described.

Experimentation has shown, however, that this is not the fact, as although the outward movement is not great, it is practically the same as the movement toward the axis. The movement of metal is the same whether inward or outward and the difference is only created of either the 30° or the 45° angle.

In the present invention the indentation substantially or completely around the threaded aperture is such that the uppermost two or three thread convolutions of the nut are converged toward the axis of the bore of the nut without any objectionable flaring of the outside dimensions of the nut. This is accomplished by pressure indenting the top surface of the nut with a peculiarly shaped tool having an outer straight side and an arcuately beveled end running from the radius of the thickness of the tool. The profile of the cutting edge is formed by a combination of a circular arc where the center line on the cylindrical portion of the tool and a conical surface tangent thereto on the inside of the tool produce a tool suitable for converging the threaded bore.

Figure 1:
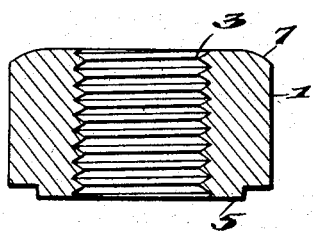
Fig. 1 is a vertical section of a conventional threaded nut.
Figure 2:
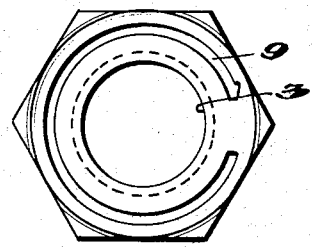
Fig. 2 is a top plan of one form of the invention.
Figure 3:
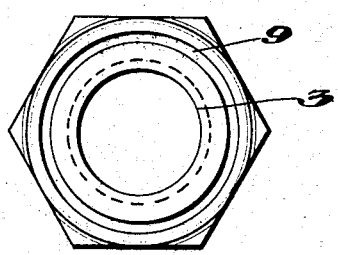
Fig. 3 is a top plan view of a further form of the invention.
Figure 4:
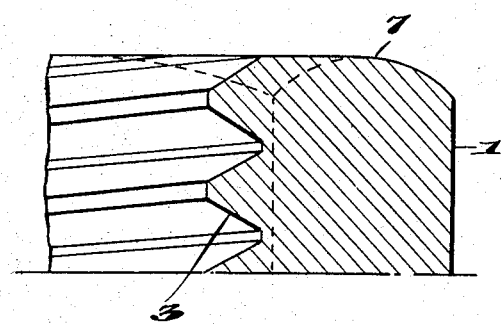
Fig. 4 is an enlarged fragmental vertical section of the thread formation of Fig. 1.

In the drawing Fig. 1 is illustrative of the conventional standard threaded nut 1 having a standard threaded bore 3 therethrough and integral washer face 5. Such a standard nut is then pressure indented on its crown or end face 7 with a substantially circular or completely circular indentation 9 around the threaded bore. In Fig. 2 the indentation 9 appears in the formation of the alphabetical letter C while in Fig. 3 the indentation completely surrounds the threaded aperture 3 and takes the form of the alphabetical letter O. The cross-section formation of the pressure cutting and indenting tool, which is moved into the crown face 7 of the nut is that of the groove 9 shown in the enlarged detail in Fig. 5. Here the outer wall 11 of the indentation 9 is straight line parallel with the outside of the nut. The effect of the depth of the indentation 9 extends downwardly to a point 13 which is sufficient to constrict the first two and one-half thread convolutions in the crown of the nut and setup the desired spring grip action. The inner or metal displacement surface of the tool, not shown, is curved from the outside straight side arcuately to produce the metal displacement of the upper threads, and actual flow of metal forming the converging of the upper threaded bore, as indicated by the dash lines 15 and the reduced diameter 17. During the indenting operation the inside of the screw bore is unsupported, and as the cylindrical tool, not shown, moves downwardly the uppermost portion of the screw threaded convolution is converged as indicated by the dash line in Fig. 5 to reduce the bore at this portion. The converging action 17 is preferably from 8° to 12° from its original perpendicular position and the depth of outer straight edge of the indentation 11 is substantially from ½ to 1 thread convolution. The amount of converging will depend on the degree of spring grip action desired and the thread of the cooperating bolt and then is controlled by the depth of the grooves 9.

The C type of indentation shown in Fig. 2 does not completely surround the bore, as a minor portion between the ends thereof is not indented, but such a C form is sufficient to converge the lock threads of the thread 3 for all practical purposes. In the O type of indentation shown in Fig. 3 the flow of metal is even and a uniform convergence of the upper thread convolutions is accomplished.

Figure 5:
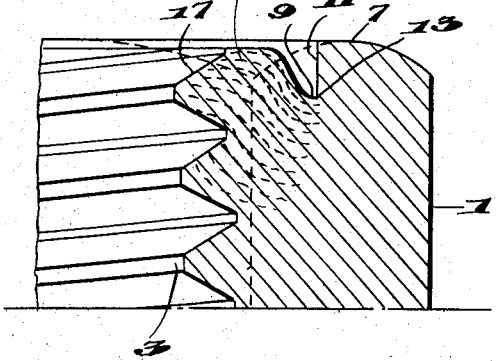
Fig. 5 is an enlarged sectional view of a portion of the nut produced by the invention with emphasis on the converging and metal flow at the crown of the annular indentation.

Fig. 5 is an enlarged view and illustrates a vertical cross-section of a completed lock nut showing the indentation 9 and convergence 17 of the threaded aperture. By shaping the hollow shearing and indenting tool from a right cylinder with an outer straight face and an arcuate beveled surface toward the inner edge of the tool it is possible to converge the threads as heretofore described while maintaining the straight sides of the nut intact whereby a proper wrench engaging surface is secured.

I claim:

1. The method of forming a grip nut from a standard threaded nut which comprises pressure indenting the crown face of the threaded nut to form a depression therein bordering the thread bore of the nut, said depression taking the configuration of the end of a hollow substantially cylindrical cutting tool having a straight exterior side wall and an arcuate bevelled inner wall, whereby the said depression is straight sided and parallel with the axis of the nut nearest the outer periphery of the nut.

2. The method of transforming a standard threaded nut into a grip nut having parallel side walls and of the type having the thread convolutions in the upper part of the threaded bore only slightly converging toward the axis of the bore comprising indenting the crown face exterior of the threaded bore, the said indentation consisting of a depression curved to conform substantially to the curvature of the bore, the cross-section of the depression having a straight side parallel to the outer side of the nut and a sloping inner side curving upwardly toward the threaded bore.

3. The method as described in claim 2 wherein the said indentation is sheared into the metal of the crown of the nut and the metal interiorly thereof is flowed inwardly to converge the upper aperture of the threaded bore.

4. The method as described in claim 2 wherein the depth of the straight side wall of the depression is from one-half to one thread convolution deep and sufficient to effect the first two or three convolutions of the thread in the crown portion of the nut to insure the desired spring grip action on the thread of a cooperating threaded member.

5. The method as described in claim 2 wherein the sloping inner wall of the depression is arcuate and converges in the uppermost convolution of the threaded bore from its original position sufficiently to effect the desired spring grip action on the thread of a cooperating threaded member without substantially flattening the thread convolutions.

6. The method as described in claim 2 wherein the depression formed in the crown face of the threaded nut extends around the major portion of the threaded bore.

7. The method as described in claim 2 wherein the depression formed in the crown face of the threaded nut is produced by cutting and flowing the metal with a suitable axially moving tool which converges the metal around the bore of the nut without bulging the nut blank along its wrench engaging faces.

EDWARD J. COLE.